United States Patent [19]

Deckler

[11] Patent Number: 5,024,173
[45] Date of Patent: Jun. 18, 1991

[54] CLUTCH FOR CHEMICAL DISPENSER FOR PLANTER

[75] Inventor: Harry C. Deckler, Williamsburg, Iowa

[73] Assignee: Kinze Manufacturing, Inc., Williamsburg, Iowa

[21] Appl. No.: 471,504

[22] Filed: Jan. 29, 1990

[51] Int. Cl.⁵ .................. A01C 7/20; G01F 11/10; F16D 13/50

[52] U.S. Cl. .................................. 111/178; 111/77; 111/63; 111/80; 222/616; 222/368; 192/70.28

[58] Field of Search ............... 111/34, 63, 65, 67, 111/73, 77, 79, 80, 170, 177, 178; 222/368, 486, 609, 610, 616; 192/70.27, 70.28, 70.22, 70.23

[56] References Cited

U.S. PATENT DOCUMENTS

| | | | |
|---|---|---|---|
| 523,856 | 7/1894 | Hoffheins | 111/77 |
| 757,813 | 4/1904 | Kinney | 111/73 |
| 1,321,293 | 11/1919 | Drake | 111/73 X |
| 1,957,738 | 5/1934 | Strandlund | 111/63 X |
| 2,022,354 | 11/1935 | Kirk | 111/73 X |
| 4,359,952 | 11/1982 | Gesior et al. | 111/80 |

FOREIGN PATENT DOCUMENTS 155684 1/1963 U.S.S.R. .............................. 111/178

Primary Examiner—Danton D. DeMille
Attorney, Agent, or Firm—Emrich & Dithmar

[57] ABSTRACT

A clutch arrangement for a particulate chemical meter for use in a planter includes an axially and rotationally moveable shaft having a coupler on a first end and a knob on a second end thereof. The clutch shaft is inserted through and coupled to a chain-driven sprocket and sprocket sleeve combination. A coiled spring disposed about the shaft urges the shaft toward and in engagement with a dispensing rotor of the chemical meter for dispensing an insecticide or herbicide. Rotation of the knob in a first direction causes a roll pin inserted through the shaft of the clutch to ride up a cam surface disposed on an end of the sprocket sleeve for axially displacing the clutch shaft and disconnecting it from the rotor. Further rotational displacement of the knob positions the shaft roll pin in a notch also disposed on the end of the sprocket sleeve for maintaining the clutch disengaged. Rotational displacement of the knob and clutch shaft in a second, opposed direction permits the roll pin to slide down the cam surface under the urging of the coiled spring for automatically engaging the clutch when the planter is moved and the sprocket is displaced in the second direction of rotation.

9 Claims, 4 Drawing Sheets

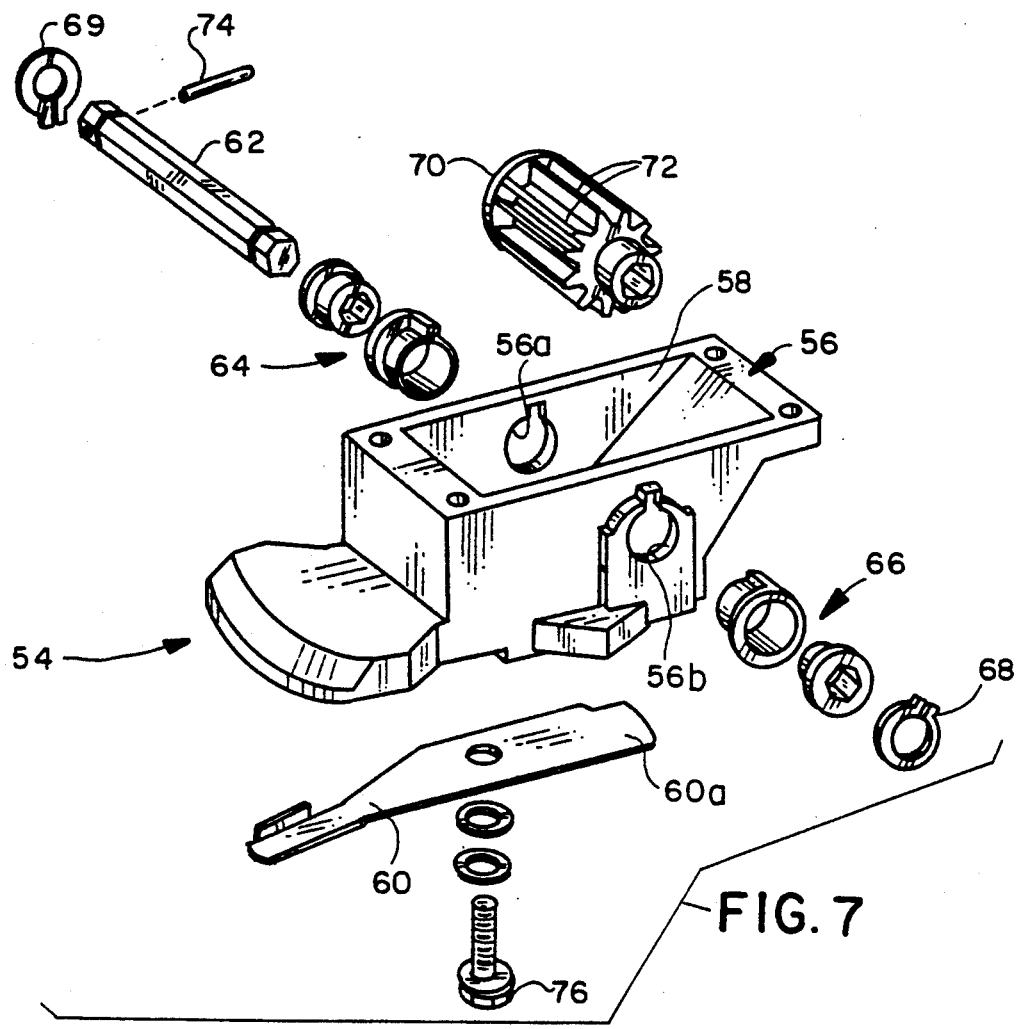
FIG. 7
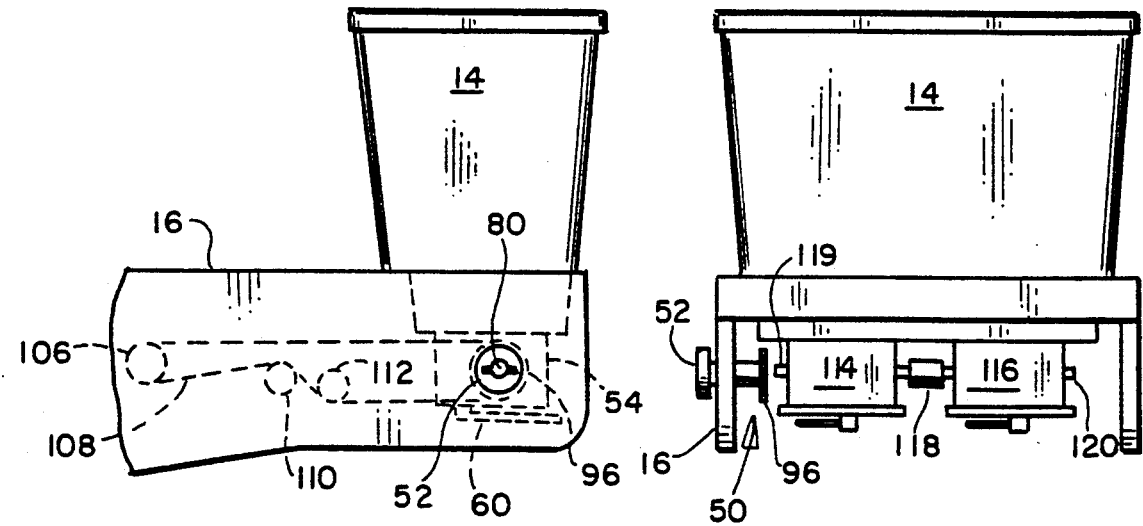
FIG. 8
FIG. 9

1

CLUTCH FOR CHEMICAL DISPENSER FOR PLANTER

FIELD OF THE INVENTION

This invention relates generally to planters as used in agriculture and is particularly directed to a clutch arrangement for selectively engaging or disengaging a chemical dispenser used in a planter. Agricultural planting equipment generally employs a plurality of individual planter units arranged in a spaced manner along a tractor-drawn support frame or "toolbar" for planting a series of rows of crops. Each planter unit includes a seed hopper from which seeds are dispensed in a metered manner via a tube attached to the seed hopper for discharge into a furrow or seed bed. After the seeds are deposited and the furrow is closed, a chemical such as a fertilizer or insecticide is frequently applied. The chemical may be in the form of a liquid or dry granules. The present invention is intended for use with the latter type of chemical.

BACKGROUND AND SUMMARY OF THE INVENTION

As in the case of the planted seeds, the chemical is also dispensed in a metered manner synchronous with the deposit of the seeds in the soil. Metering of the chemical is accomplished generally by a chemical dispenser driven by an endless chain and idler and drive sprocket combination which is rotationally displaced in response to movement of the planter units. It is desirable to be able to disconnect this chemical metering arrangement from the driving means during seeding of crops that do not require chemical, application. The chemical hoppers are also disconnected from the chemical metering arrangement to facilitate emptying and cleaning of the hoppers particularly when the planting operation calls for the use of a new substance. Occasionally, a hopper must be removed from the planter unit for repair or replacement and this too should be accomplished with minimal impact on the planter unit and without tampering with the metering system.

U.S. Pat. No. 4,359,952 to Gesior et al. discloses an arrangement for attaching a granular chemical hopper to a dispenser. Removal of the hopper assembly from the dispenser is accomplished by removing one or two fasteners, which may be klik pins and disengaging a clutch shaft by pulling the pin and moving the shaft laterally outward and reinstalling the pin in the disengaged position. This approach thus makes use of a loose pin which can easily become lost and requires three separate steps involving removal of the pin, axially displacement of the clutch shaft, and re-insertion of the pin following re-alignment of the associated apertures. This approach is cumbersome, subject to misalignment errors, and requires the replacement of lost pins.

The present invention addresses the aforementioned limitations of the prior art by providing a clutch arrangement for a granular chemical dispenser for use in a planter which permits engagement and disengagement of the dispenser with a simple twist of a readily accessible knob in a single operation. The inventive clutch arrangement is integral with the planter and does not require disassembly or removal of any components.

Accordingly, it is an object of the present invention to provide an improved chemical dispenser installation in an agricultural planter.

Another object of the present intention is to facilitate the connecting and disconnecting of a granular chemical dispenser such as for an insecticide or herbicide in a planter.

A further object of the present invention is to provide an improved manually operable clutch which facilitates coupling and decoupling of a chemical dispenser in an agricultural planter.

A still further object of the present invention is to provide an easily manipulated clutch for use with a chemical dispenser in a planter which is integral with the planter, does not employ any loose parts, and requires only a single operation to engage or disengage the dispenser.

This invention contemplates a clutch apparatus for coupling the rotor of a granular chemical dispenser in a planter to a drive mechanism, the apparatus comprising a shaft coupled to the drive mechanism and having gripping means on a first end and a coupler on a second, opposed end thereof; bearing means for rotationally coupling the shaft to a housing, wherein the shaft is moveable along a longitudinal axis thereof within the bearing means; biasing means coupled to the shaft for urging the shaft toward the rotor whereupon the coupler engages the rotor; axial displacement means coupled to the shaft for moving the shaft away from the rotor and for disconnecting the coupler from the rotor when the shaft is rotated in a first direction in decoupling the dispenser from the drive mechanism; and retaining means coupled to the shaft for maintaining the shaft and coupler axially displaced from the rotor, whereupon rotation of the shaft in a second, opposed direction causes displacement of the shaft toward and engagement of the coupler with the rotor under the influence of the biasing means.

BRIEF DESCRIPTION OF THE DRAWING

The appended claims set forth those novel features which characterize the invention. However, the invention itself, as well as further objects and advantages thereof, will be understood by reference to the following detailed description of a preferred embodiment taken in conjunction with the accompanying drawings, where like reference characters identify like elements throughout the various figures, in which:

FIG. 7 is an exploded perspective view of a dispenser for a chemical in granular form with which the clutch of the present invention is intended for use;

FIG. 8 is a simplified schematic diagram shown partially in phantom of a chemical dispenser installation for a planter with which the clutch of the present invention is intended for use; and FIG. 9 is a plan view of a side-by-side arrangement of two chemical dispensers with which the clutch and associated coupling arrangement of the present invention may be used.

DETAILED DESCRIPTION OF THE PREFERRED EMBODIMENT

Figure 1:
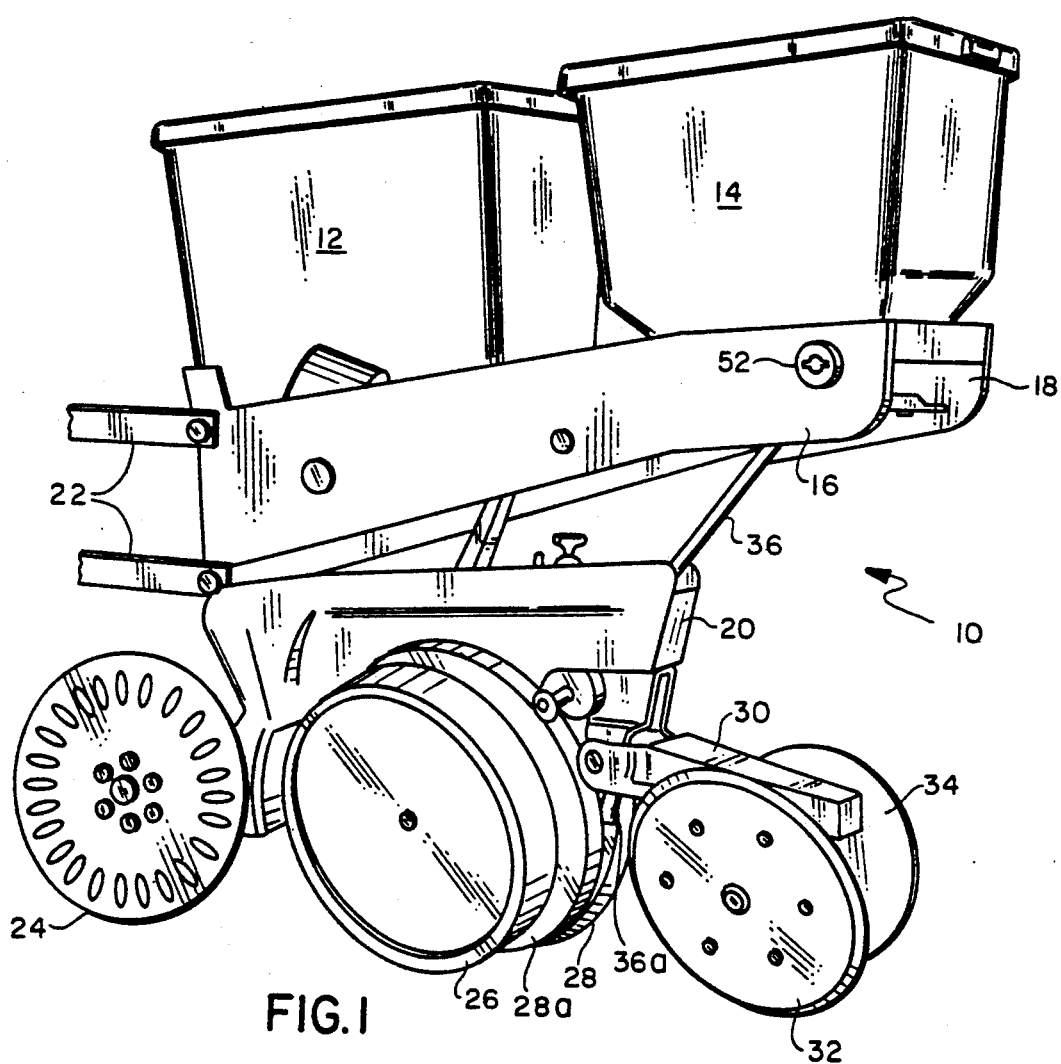
FIG. 1 is a perspective view of a planter unit in which the clutch for a chemical dispenser of the present invention is intended for use.

Referring to FIG. 1, there is shown a perspective view of a planter unit 10 in which the clutch for a chemical dispenser is intended for use. The planter unit 10 shown in FIG. 1 is conventional in design and operation and includes a forward seed hopper 12 and an aft chemical hopper 14. The chemical hopper 14 contains a chemical in granular form which is discharged as the seeds are planted. The chemical may be a herbicide, an insecticide or fertilizer. Seeds are dispensed from the seed hopper 12 and a chemical is dispensed from the chemical hopper 14 in a metered manner as dictated by the spacing requirements of the type of seed being planted. The present invention is particularly directed to a clutch mechanism for coupling and decoupling a chemical meter and a meter drive arrangement as described in detail below.

The planter unit 10 includes a pair of spaced upper frame support arms 16 and 18 which are coupled to and provide support for the seed and chemical hoppers 12, 14. Attached to forward portions of the upper frame support arms 16, 18 are a plurality of coupling links 22 which are adapted for attaching the planter unit 10 to a traction vehicle drawn toolbar, which is not shown in the figure for simplicity. A lower portion of the planter unit 10 includes a lower frame 20 to which are rotationally mounted a plurality of disc-like rotating members. For example, attached to a forward portion of the lower frame 20 is a rotating ripple, or fluted, coulter 24. Also attached to the lower frame 20 are first and second spaced furrow forming discs 28 and 28a. A trailing link 30 pivotally coupled to the lower frame 20 has attached thereto first and second angled closing wheels 32 and 34. During planting, as the planter unit 10 is drawn through the field, the ripple coulter 24 breaks up and loosens the soil, while the first and second furrow forming discs 28 and 28a form a shallow furrow into which the seeds are deposited. Depth is controlled by depth wheels, wherein only one of the depth wheels is shown as element 26 in FIG. 1 for simplicity. Following deposit of the seeds and a chemical in the thus formed furrow, the first and second angled closing wheels 32, 34 then close the furrow, burying the discharged seeds.

The clutch of the present invention is disposed immediately below the chemical hopper 14 and intermediate the two upper frame support arms 16, 18, with only a control knob 52 of the clutch shown in FIG. 1. The clutch is intended for use with a chemical meter, also not shown in FIG. 1, which controls the discharge of a chemical granular form from the hopper 14 via a tube 36. A lower end 36a of the discharge tube 36 is shown positioned immediately aft of and intermediate the first and second furrow forming discs 28, 28a. The lower end 36a of the discharge tube 36 is also positioned aft of and in alignment with a seed discharge tube (also now shown in FIG. 1) extending downward from the seed hopper 12.

Figure 4:
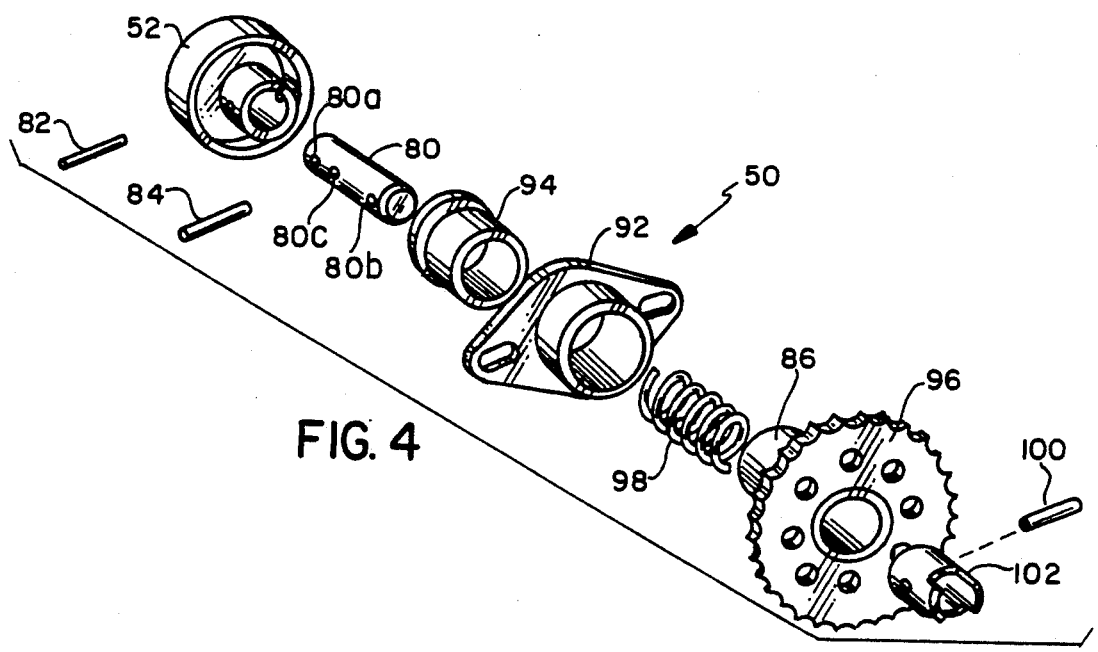
FIG. 4 is an exploded perspective view of a clutch for a chemical dispenser for use in a planter in accordance with the principles of the present invention.
Figure 3:
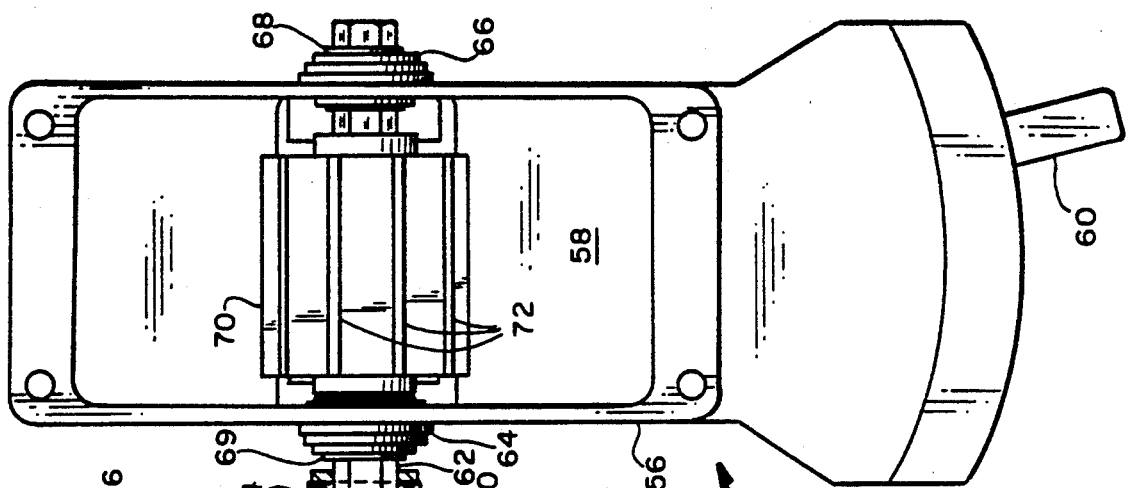
FIGS. 2 and 3 are combined planar and sectional views of a chemical dispenser and the clutch of the present invention in which the clutch is respectively shown disengaged from and engaged with the chemical dispenser.
Figure 2:
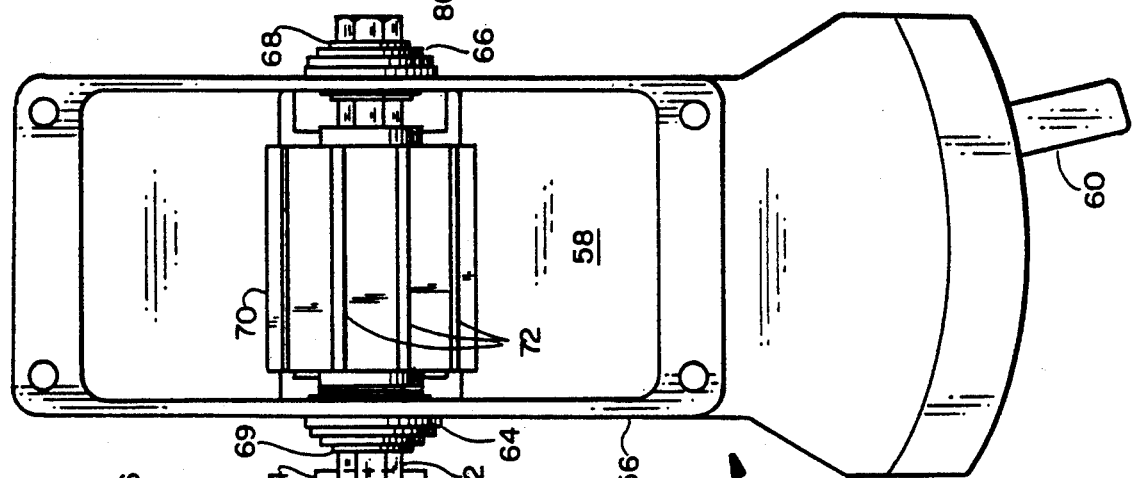

Referring to FIGS. 2 and 3, there are shown combined sectional and planar views of a clutch 50 in combination with a chemical meter 54 in accordance with the present invention. FIG. 2 shows the clutch 50 disengaged from the chemical meter 54, while FIG. 3 shows the clutch engaging the chemical meter. Reference is also made to FIGS. 4 and 7 which are exploded perspective views of the clutch 50 and chemical meter 54, respectively.

The chemical meter 54 may be conventional in design and operation and includes a generally rectangular housing 56 having a large open upper portion and a small aperture in a lower portion thereof, with tapered inner walls disposed intermediate its upper and lower portions. The housing 56 includes a pair of apertures 56a, 56b in facing, lateral portions thereof. A chemical in granular form is deposited in the open upper portion of the housing 56 and is discharged from the housing via the smaller, lower aperture therein by the rotational displacement of a rotor 70 disposed within the housing 56. The rotor 70 includes a plurality of spaced blade-like members 72 disposed about the periphery thereof. Rotation of the rotor 70 causes its blade-like members 72 to engage and displace the chemical particles through the aperture in the lower portion of the housing 56. The rotor 70 is positioned in alignment with the facing apertures 56a, 56b within the housing 56 and is maintained in position therein while being free to rotate by bearing/sleeve means. Thus, a shaft 62 is inserted through and along the length of the rotor 70. The outer periphery of the shaft 62 is keyed to the inner periphery of a channel through the rotor 70 so that the shaft and rotor rotate in unison. A first set of bearing/sleeve means 64 is inserted in aperture 56a, while a second set of bearing/sleeve means 66 is positioned in aperture 56b within housing 56. The shaft 62 is then inserted through the first and second sets of bearing/sleeve means 64, 66 and is maintained thereon by means of first and second retaining rings 68 and 69. Each of the retaining rings 68, 69 is adapted for positioning over a respective end of the shaft 62 and insertion in a groove therein. One end of the shaft 62 is provided with an aperture therein for receiving in tight fitting relation a drive pin 74 inserted therethrough. The first and second sets of bearing/sleeve means 64, 66 allow the shaft 62 and rotor 70 to freely rotate within the housing 56 while preventing the discharge of the particulate chemical through the lateral apertures within the housing.

Attached to a lower portion of the housing 56 by means of the combination of washers and a mounting bolt 76 is an aperture control arm 60. The aperture control arm 60 is free to pivot about the mounting bolt 76, with a first end 60a of the arm positioned adjacent to the aforementioned lower aperture (not shown) within the housing 56. The position of the first end 60a of the aperture control arm 60 relative to the aforementioned aperture is determined by the amount of chemical to be discharged with the seeds being planted. The size of the aperture is determined by the relative position of the control arm 60 relative to the aperture, which may be adjusted by movement of the aperture control arm 60 about mounting bolt 76. The aforementioned lower aperture within the housing 56 is disposed below the rotor 70 with the chemical meter 54 viewed as shown in FIGS. 2 and 3. The lower chemical discharge aperture is therefore not visible in these figures.

The clutch 50 includes an elongated, cylindrical shaft 80 having a plurality of spaced holes or bores designated 80a, 80b and 80c. Each of the aforementioned bores is adapted to receive a respective roll pin for coupling the shaft 80 to various components of the clutch 50. For example, a first roll pin 82 is inserted through bore 80a adjacent to a distal or outboard end of the shaft 80 for attaching a control knob 52 to the shaft. Similarly, a second roll pin 100 is adapted for insertion through a bore 80b in an opposed or inner end of the shaft 80 for attaching a coupling 102 to this end of the shaft. An intermediate bore 80c in the shaft 80 is adapted to receive a third roll pin 84 as described in the following paragraphs.

The clutch 50 is adapted for mounting to and insertion through an aperture within the frame support arm 16. The clutch 50 further includes a bearing mount 92 securely attached to the frame support arm 16 by means of first and second combinations of threaded mounting bolts and nuts 88 and 90. Disposed concentrically within the bearing mount 92 is a bearing sleeve 94. The bearing sleeve 94 is also concentrically disposed in relation to an aperture within the frame support arm 16. Concentrically disposed within the bearing sleeve 94 is a sprocket sleeve, or hub, 86 which is securely coupled at one end thereof to a sprocket 96. The sprocket 96 is adapted for coupling to a drive system by means of an endless chain (not shown) for rotating the rotor 70 within the chemical meter 54 in discharging a granular chemical therefrom. Disposed within the sprocket sleeve 86 and freely moveable both linearly and rotationally therein is the shaft 80. An inner portion of the sprocket sleeve 86 is provided with a circular shoulder. A coiled compression spring 98 is disposed about an intermediate portion of the cylinder 80 and is positioned between and in abutting contact with the aforementioned shoulder of the sprocket sleeve 86 and coupling 102. The coiled compression spring 98 urges the coupling 102 away from the aforementioned shoulder portion of the sprocket sleeve 86 so as to extend the cylinder 80 from the sprocket sleeve toward the rotor shaft 62. Thus, as shown in FIGS. 2 and 3, the shaft 80 together with the control knob 52 and coupling 102 at respective ends thereof are urged toward the right, or in the direction of the chemical meter 54. Abutting contact between the outer end of the sprocket sleeve 86 and control knob 52 limits extension of the shaft 80 from the sprocket sleeve 86.

With the shaft 80 fully displaced toward the chemical meter 54 under the influence of the coiled compression spring 98, coupling 102 engages the adjacent end of the rotor shaft 62 as shown in FIG. 3. In this position, the coiled compression spring 98 is extended to effect full rightward displacement of the shaft 80. Rotation of the sprocket 96 under the influence of the planter drive system (not shown) results in a corresponding rotational displacement of the rotor shaft 62 and rotor 70 to effect discharge of a granular chemical from the meter 54.

The sprocket 96 and aforementioned drive system are decoupled from the rotor 70 using the clutch 50 of the present invention in the following manner. Disposed on the outer end of the sprocket sleeve 86 are two recesses 86a and 86b which are located approximately ninety degrees apart on the sleeve. These recesses are adapted to receive the drive pin 84 which is connected to shaft 80. Recess 86a (called a drive recess) is deeper (i.e., extends axially toward rotor 70 on the meter) than recess 86b so that when drive pin 84 is in recess 86a, the drive coupler 102 is in drive engagement with the rotor shaft 62, urged by spring 98, as seen in FIG. 3. When drive pin 84 is received in the shallow recess 86b (called a retainer recess), the shaft 80 is displaced further outward of the meter and the drive coupler 102 and rotor shaft 62 are disengaged.

The drive pin 84 is selectively placed in the desired recess by rotating the knob or grip 52. Recess 86a is defined by an inclined cam surface 86c and an axial or straight surface 86d. When viewed from the left of the row unit (i.e., the side on which the knob 52 is located), when the knob is rotated counterclockwise, the cam surface urges the shaft axially outwardly as the drive pin 84 rides along the cam surface. Further rotation of the knob will seat the drive pin in the retainer recess 86b. In this position, the clutch is disengaged.

Figure 5B:
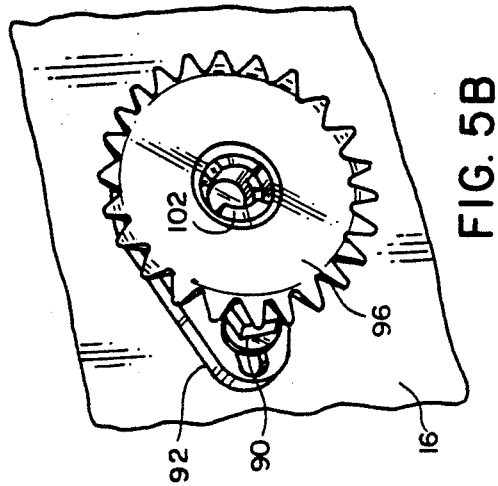
FIGS. 5A and 5B are perspective views illustrating the positions of a control knob and a sprocket/coupler combination, respectively, of the chemical dispenser clutch of the present invention when the clutch is disconnected from the dispenser.
Figure 6B:
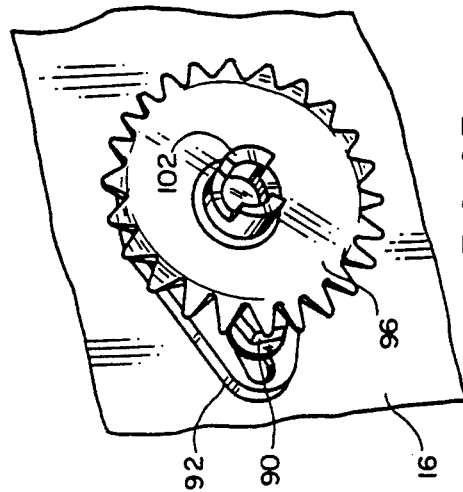
FIGS. 6A and 6B are perspective views of the clutch's control knob and sprocket/coupler combination, respectively, with the clutch engaging the dispenser.
Figure 5A:
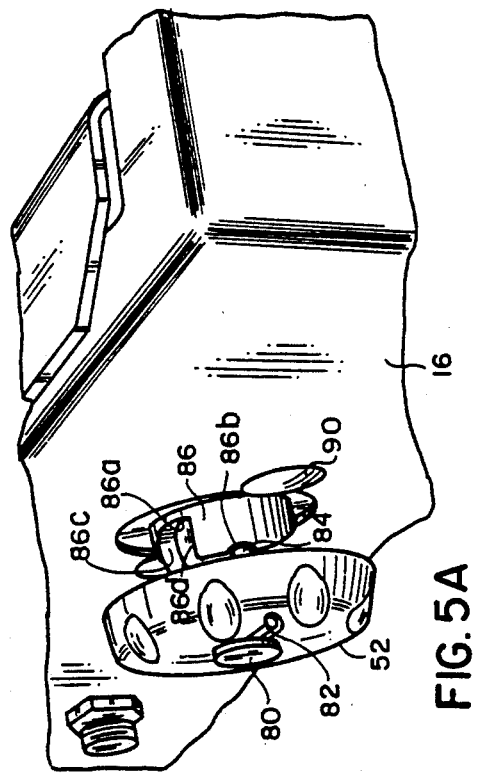
Figure 6A:
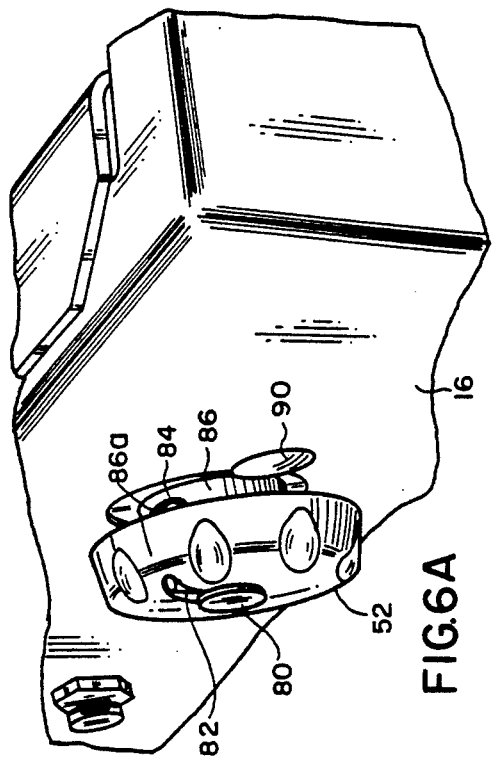

The drive recess 86a and retaining notch 86b are radially displaced from one another around the circumference of the end of the sprocket sleeve 86. Perspective views of the control knob end portion of the clutch assembly of the present invention are shown in FIGS. 5A and 6A. The drive pin 84 inserted through and coupled to an intermediate portion of the shaft 80 is adapted for positioning either in the drive recess 86a or the retainer recess 86b on the end of the sprocket sleeve 86. FIG. 6A shows the drive pin 84 positioned in drive recess 86a adjacent the cam surface 86e of the sprocket sleeve 86. Rotation of the sprocket sleeve 86 in response to rotational displacement of the sprocket attached thereto in a counter-clockwise direction as viewed in FIG. 6A causes a corresponding counter-clockwise rotation of the shaft 80. When the knob 52 is rotated counter-clockwise, drive pin 84 disposed in drive recess 86a on the cam surface 86c on the sprocket sleeve 86 as shown in FIG. 6A, the shaft 80 is fully displaced toward and is coupled to the rotor shaft and assumes the position of FIG. 3. Thus, counter-clockwise rotation of shaft 80 causes a corresponding counter-clockwise rotation of rotor shaft 62 and rotor 70 attached thereto. FIG. 6B is a perspective view showing the position of the coupler 102 extending through and out of the sprocket 96 for engaging the rotor shaft as shown in FIG. 3. The coupler 102 includes a pair of facing recessed portions adapted for securely engaging the drive pin 74 on the end of the rotor shaft 62.

With the sprocket 96 and sprocket sleeve 86 not rotating, counter-clockwise rotation of the control knob 52 causes the drive pin 84 to ride up the cam surface 86c on the end of the sprocket sleeve 86. This causes a leftward axial displacement of the shaft 80 as shown in FIG. 5A so that it assumes the position illustrated in FIG. 2. In this position, the coupler 102 on the end of the shaft 80 is disengaged from the rotor shaft 62. Continued counter-clockwise rotation of the control knob 52 as well as the shaft 80 aligns the drive pin 84 with a retaining notch 86b on the end of the sprocket sleeve 86. With the shaft 80 urged inwardly by the aforementioned coiled compression spring 98, the drive pin 84 is securely maintained within the retaining notch 86b on the end of the sprocket sleeve 86. In this manner, the shaft 80 is securely maintained in a position displaced and decoupled from the rotor shaft 62 as shown in FIG. 2. With the drive pin 84 disposed within the retaining notch 86b of the sprocket sleeve 86, the coupler 102 on the other end of the shaft 80 is positioned in a recessed manner within the sprocket 96 as shown in FIG. 5B. While the present invention is disclosed as including a single cam surface and retaining notch on the end of the sprocket sleeve, the invention also contemplates a pair of cam surfaces and retaining notches disposed about the end of the sprocket sleeve in facing relation for engaging opposed ends of the rotor shaft's drive pin.

Referring to FIG. 8, there is shown partially in phantom a simplified side plan view of a planter arrangement in which the clutch of the present invention is intended for use. The hopper 14 contains the particulate chemical to be dispensed. The hopper 14 is attached to and supported by at least one upper frame support arm 16 and is positioned above and in alignment with the chemical meter 54 shown in dotted line form. The control knob 52 is disposed outside of and adjacent to the upper frame support arm 16 and is coupled to the aforementioned shaft 80. The shaft 80 extends through an aperture within the upper frame support arm 16 and engages a rotor shaft (not shown) in the chemical meter 54 as previously described. Disposed on a lower portion of the chemical meter 54 for controlling dispensing of the particulate chemical therefrom is an aperture control arm 60 as previously described. The sprocket 96 (shown in dotted line form) is coupled by means of a chain 108 to a drive sprocket 106 and the combination of first and second idler sprockets 110 and 112. The drive sprocket 106 is coupled to and rotates synchronously with the driving wheels of the planter which are now shown for simplicity. The drive system shown in FIG. 8 is conventional in design and operation, as the clutch of the present invention is intended for use with any of the more commonly employed planter drive arrangements.

Referring to FIG. 9, there is shown an aft planar view of a dual chemical dispenser arrangement with which the clutch 50 of the present invention may be used. The arrangement of FIG. 9 includes first and second chemical meters 114, 116 arranged side-by-side and immediately beneath the chemical hopper 14. Disposed within and extending through the first chemical meter 114 is a first rotor shaft 119, while positioned within and extending through the second chemical meter 116 is a second rotor shaft 120. Adjacent ends of the first and second rotor shafts 119, 120 are connected by a coupler 118 which may be conventional in design. For example, the coupler 118 may be of the spline type for rigidly connecting the first and second rotor shafts 119, 120. Engagement of the clutch 50 with an end of the first rotor shaft 119 as previously described allows for rotational displacement of the first as well as the second rotor shaft to provide a dual particulate chemical dispensing capability.

There has thus been shown a clutch for a chemical dispenser for use in an agricultural planter which facilitates coupling and decoupling of a conventional chain and sprocket drive system and the rotor of a particulate chemical dispenser in the planter. The clutch assembly includes an axially and rotationally moveable shaft for coupling a chain driven sprocket to a rotor in the chemical dispenser. The combination of a roll pin inserted through the shaft and a cam surface on a sprocket sleeve in which the shaft is positioned allows the shaft to be axially displaced away from the rotor for disconnecting the chemical dispenser from the planter drive system. A notch in the sprocket sleeve is adapted to receive the roll pin following disengagement of the shaft from the rotor to maintain the clutch disengaged. A coiled spring disposed about the shaft and within the sprocket urges the shaft toward and in engagement with the dispenser's rotor. The clutch of the present invention does not include any loose parts that have to be removed and re-installed in an installation which is easily operated, readily accessible, and inexpensively manufactured and assembled.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In an agricultural planter row unit having a frame, a hopper mounted to said frame for storing chemicals, a meter for metering said chemicals from said hopper for distribution and including a rotor, and drive means including a drive sprocket adapted to drive said rotor, an improved clutch for selectively coupling said drive sprocket to said rotor or uncoupling said drive sprocket from said rotor comprising:

sleeve means mounted to said drive sprocket for rotation therewith and axially aligned with said rotor, said sleeve means including a drive recess and a retainer recess spaced angularly apart on said sleeve means;

bearing means for rotatably mounting said sleeve means and said drive sprocket to said frame;

a shaft mounted for rotation and for selective axial movement in said sleeve means and including a drive coupler for selectively engaging said rotor in driving engagement;

biasing means for urging said shaft axially such that said drive coupler is urged into driving engagement with said rotor; and a grip member mounted to said shaft, said shaft including drive pin means adapted to be received in one of said recesses, said drive and retainer recesses being spaced at different distances from said rotor and a cam surface extending between one end of said drive recess and the adjacent end of said retainer recess, said cam surface being arranged such that when said grip member is rotated in one direction, said drive pin rides along said cam surface from said drive recess to said retainer recess against the force of said biasing means, thereby moving said shaft axially and disengaging said coupler from said rotor, and when said grip member is rotated in a counter direction, said drive pin rides along said cam surface from said retainer recess to said drive recess and said biasing means moves said shaft axially to cause said coupler to engage said rotor.

2. The apparatus of claim 1 wherein said retainer recess includes a notch disposed on a first end of said sleeve adjacent to the cam surface thereon for receiving said drive pin means under the influence of said biasing means.

3. The apparatus of claim 2 wherein said cam surface and said notch are disposed adjacent one another on a distal end of said sleeve means.

4. The apparatus of claim 3 wherein said biasing means includes a coiled spring disposed about said shaft.

5. The apparatus of claim 4 wherein said coiled spring is disposed between and in abutting contact with said shaft and said sleeve means.

6. The apparatus of claim 5 wherein said drive coupler is disposed on an end of said shaft adjacent to the rotor.

7. The apparatus of claim 6 wherein said grip member includes a knob.

8. The apparatus of claim 7 wherein said rotor includes a shaft extending therethrough having a drive pin inserted therein adjacent to an end thereof, and wherein said drive coupler includes facing recessed portions adapted to engage said drive pin in tight fitting relation.

9. The apparatus of claim 8 wherein said drive coupler is disposed within said sleeve means when axially displaced away from the rotor and wherein said drive coupler extends out of said sleeve means when engaging the rotor.

* * * * *